Figure 1:
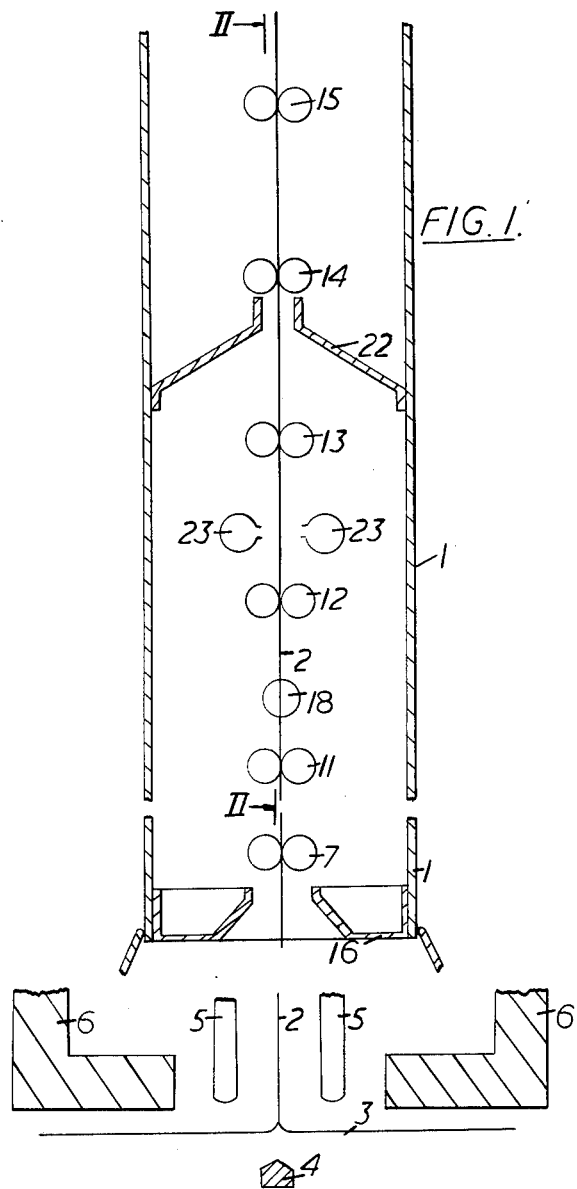

Inventors
GEORGE HUNTLEY OXLEY
EDMUND SYDNEY LITTLER

United States Patent Office 3,226,216
Patented Dec. 28, 1965

3,226,216
METHOD OF AND APPARATUS FOR ANNEALING
SHEET GLASS
George Huntley Oxley, St. Helens, and Edmund Sydney Littler, Widnes, England, assignors to Pilkington Brothers Limited, Liverpool, England, a company of Great Britain
Filed Aug. 8, 1962, Ser. No. 215,605
Claims priority, application Great Britain, Aug. 18, 1961, 29,962/61
10 Claims. (Cl. 65—95)

This invention relates to the manufacture of sheet glass.

In the manufacture of sheet glass a continuous ribbon of flat glass is formed and advanced through the annealing lehr where the glass is annealed.

It is well known that, if in the process of annealing the glass excessive or local residual strains are set up, the glass is difficult to cut and accordingly losses will occur when the large sheets cut off at the end of the lehr are being cut to smaller sizes.

Many attempts have been made to control the annealing so as to eliminate this characteristic due to imperfect annealing, but the continuous attempts which have been made to perfect the cooling in the annealing zone of the lehr have not been entirely satisfactory from one point of view or another.

According to the present invention there is provided a process for improving the annealing of flat glass in ribbon form which is advanced through a lehr wherein the glass is annealed, characterised by heating up the marginal portions of the ribbon to a temperature towards the temperature of the corresponding central portion of the ribbon, while the ribbon is passing through the annealing zone in the lehr, and thereby maintaining the marginal portions of the glass ribbon at a temperature above the strain point of the glass until the glass in the central portion cools to near the strain point, and then allowing the glass in both the marginal and central portions to cool below the strain point.

The temperature and the rate of cooling of the central portion of the glass ribbon being advanced through the annealing zone of the lehr may be controlled by concentrating the flow of a gaseous fluid through the lehr over the central portion, so that, in the lower temperature range in the annealing zone, the temperature of the central portion of the glass is brought close to the temperature of the marginal portions of the ribbon, and both the marginal and central portions are cooled through the strain point at substantially the same moment of time.

Desirably the present invention provides a process for improving the annealing of flat glass in ribbon form which is advanced through a lehr wherein the glass is annealed characterised by heating the marginal portions of the ribbon, introducing ancillary gaseous fluid into the annealing lehr, and, at a position in the annealing lehr beyond the position at which the marginal portions of the glass ribbon are heated, constraining the flow of the gaseous fluid to pass over a central portion of the glass ribbon, whereby the marginal portions of the ribbon are maintained at a temperature above the strain point of the glass, as the glass ribbon is advanced through the annealing zone, until the glass in the central portion reaches the strain point.

The present invention further provides a process for improving the annealing of flat glass in ribbon form which is advanced through a lehr wherein the glass is annealed which process is characterised by maintaining the marginal portions of the ribbon, while it is passing through the annealing range, at a temperature above the strain point of the glass by contacting the faces of the said marginal portions with a gaseous fluid at a temperature greater than the temperature of the marginal portion which it contacts but insufficient to raise the temperature of the marginal portion above the highest temperature of the corresponding central portion, maintaining said temperature above the strain point until the glass in the central portion cools to near the strain point and then allowing the glass in both the marginal and central portions to cool below the strain point at a controlled rate of cooling.

Preferably when the gaseous fluid at a temperature greater than the temperature of the marginal portions of the glass ribbon which it contacts is used, this gaseous fluid is applied to the glass ribbon at a position where the marginal temperature of the glass is just above the lower temperature limit of the annealing range. In general the critical annealing zone is at temperatures of the order of 570° C. to 480° C. for present-day sheet glass.

A process according to the invention has application in either a vertical or horizontal annealing lehr. In a horizontal lehr, the flow of the gaseous fluid in the direction of movement of the glass ribbon through the lehr is induced by a fan or other draught-introducing means. In a vertical lehr, on the other hand, there is a natural movement of the gases upwards due to the differences in temperature.

According to a feature of the present invention, there is provided a process for continuously annealing flat glass in ribbon form which is advanced through a lehr wherein the glass is annealed, characterised by causing a gaseous fluid at a temperature greater than the temperature of the marginal portions of the glass ribbon which it contacts to come into heat exchange contact with the margins of the glass ribbon at one position in the annealing zone and thereafter constraining the upward flow of the now cooler gaseous fluid to pass over the central portion of the glass ribbon thereby retarding the cooling of the central portion in the annealing zone with consequential decrease in the generation of residual strains in the glass in the annealing zone.

According to a further feature of the invention, there is provided a process for continuously annealing flat glass in ribbon form drawn vertically from a body of molten glass and advanced through a lehr, in which lehr the glass is cooled to a temperature at which the ribbon can be cut into sheets, characterised by causing a gaseous fluid, at a temperature greater than the temperature of the marginal portions of the glass ribbon in the annealing zone, to be moved into heat exchange contact with the glass ribbon in a direction parallel to the face of the glass ribbon and substantially perpendicular to the direction of movement of the ribbon through the annealing zone in the lehr, so that the temperature gradients in the glass ribbon are controlled thereby reducing the strains in the resulting glass ribbon.

Preferably the gaseous fluid is moved into heat exchange contact with the actual edges of the glass ribbon.

Conveniently there is additionally brought into heat exchange contact with the glass ribbon in the annealing zone across the full width of the glass ribbon a gaseous fluid, the temperature of which is greater than the surface temperature of any part of the glass ribbon at the level in the lehr at which the additional gaseous fluid is introduced.

The temperature of the gaseous fluid which is used in either of the stages of the process may conveniently be any temperature between 600° C. and 1200° C. The upper limit on this temperature range is fixed by the requirement that the temperature of the gaseous fluid must not be so great that there is any danger of the marginal portions of the glass ribbon softening as a result of contact with the gaseous fluid or that after heat exchange with the marginal portions the temperature of the gaseous fluid should not be so great that it materially raises the temperature of any part of the central portion of the ribbon. Preferably the temperature of the gaseous fluid which is introduced is of the order of 900° C. to 1100° C.

It is believed that the improved quality of the glass sheet obtained by a process according to the invention is due to a reduction in the temperature gradient across the width of the glass ribbon in the annealing zone as well as in a reduction in the temperature gradient through the thickness of the ribbon. Furthermore the arrangement is such that, so far as possible, both the marginal and central portions of the glass ribbon are cooled through the strain point at substantially the same moment of time.

Desirably the upward flow of the gaseous fluid is constrained to pass over the central portion of the glass ribbon by virtue of the pressure and velocity at which the fluid is brought into heat exchange contact with the edges of the glass ribbon in a vertical anealing lehr. In the preferred embodiment of the invention, however, there are additionally provided in the lehr baffles which are above the level at which the gaseous fluid is introduced into the lehr and which themselves ensure that the gaseous fluid passes over the central portion of the glass ribbon rather than over the marginal portions of the ribbon.

Figure 2:
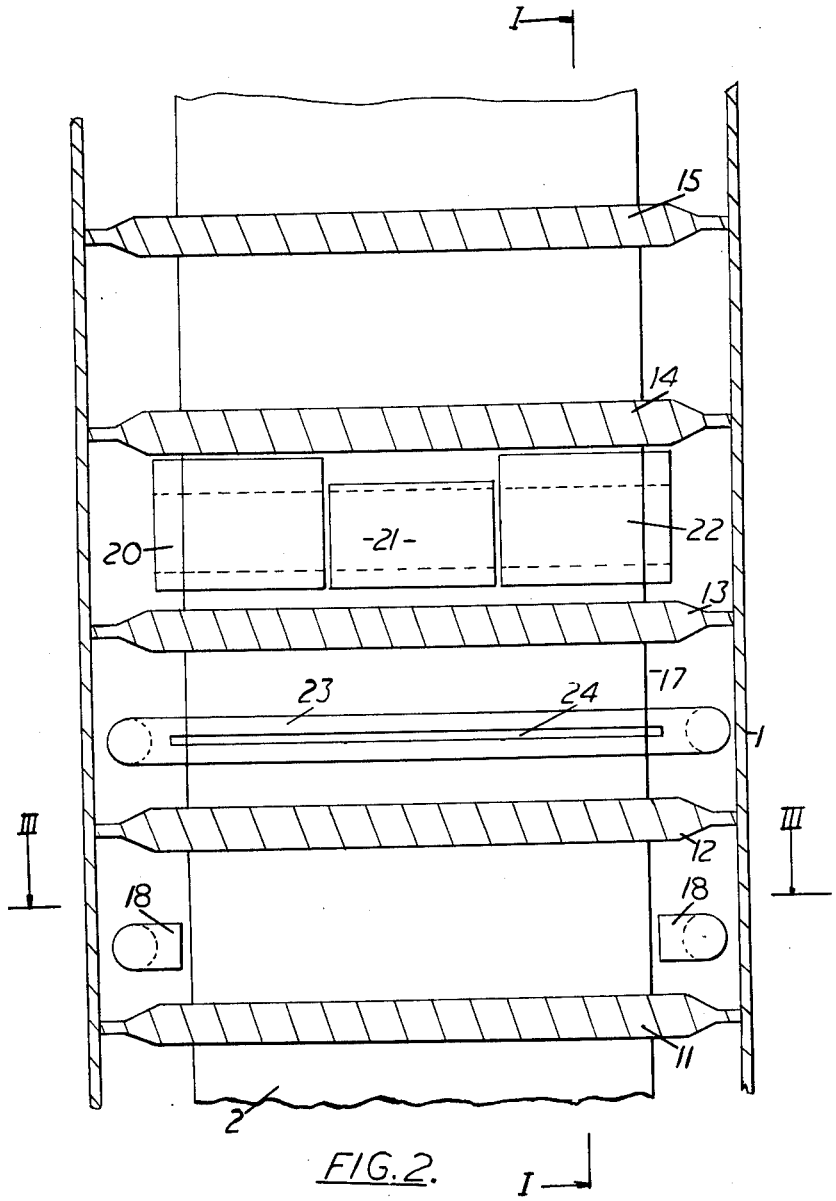
Figure 3:
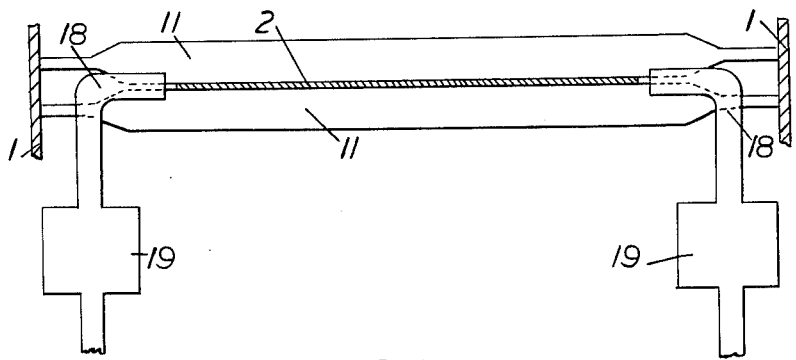
Figure 4:
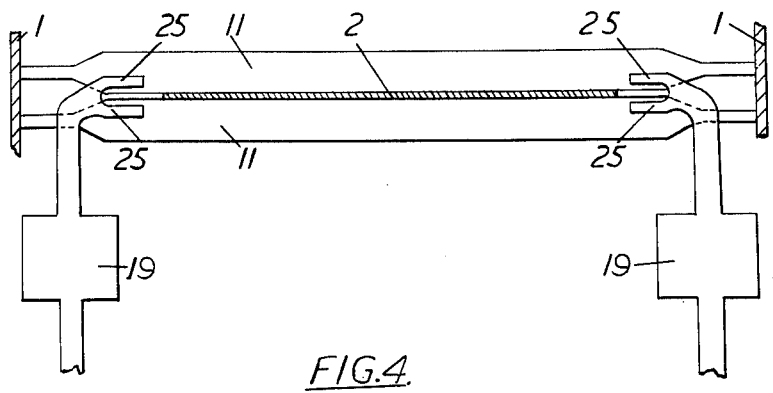

In order that the invention may be more clearly understood, reference will now be made to the accompanying drawings which illustrate by way of example preferred embodiments of the invention and in which:

FIG. 1 shows a tower lehr superimposed in normal manner over a drawing chamber in which a ribbon of glass is vertically drawn from the body of molten glass in the chamber, the view in FIG. 1 being a sectional view of the tower lehr taken along the lines I—I of FIG. 2, FIG. 2 shows a sectional view of the tower lehr of FIG. 1 taken along the lines II—II, FIG. 3 is a sectional plan view taken along the lines III—III of FIG. 2, and FIG. 4 is a plan view similar to that of FIG. 3 of a tower lehr incorporating an alternative embodiment of the invention.

In the drawings like reference numerals designate the same or similar parts.

Referring to the drawings and more particularly to FIG. 1 a tower lehr 1 is superimposed in normal manner over the drawing chamber in which a ribbon of glass 2 is drawn vertically from the bath of molten glass 3 in the drawing chamber. The ribbon 2 is drawn from the surface of the bath above a draw bar 4 submerged in known manner in the molten glass to stabilise the line of draw.

The glass ribbon 2 is drawn vertically between the coolers 5 and the L blocks 6 before entering the annealing lehr 1. The annealing lehr 1 includes pairs of drawing rolls of which there are shown in FIG. 1 rolls 7, 11, 12, 13, 14 and 15. The rolls shown in FIG. 1 are respectively the 1st, 5th, 6th, 7th, 8th and 9th drawing rolls in the annealing lehr the 2nd, 3rd and 4th rolls having been omitted for clarity. Catch pans 16 are provided in the normal way at the foot of the annealing lehr which may also include the usual baffles not shown in FIG. 1. As the ribbon 2 of glass is drawn from the bath of molten glass 3, the glass cools and when it passes through the first set of drawing rolls 7, the glass ribbon is relatively firm. The glass ribbon naturally cools more quickly over the marginal portions of the ribbon than in the central portion and in addition during the drawing process the thickened edges of the ribbon are preferentially cooled to prevent narrowing or "necking" of the ribbon. In this connection when reference is made to the marginal portion, this is intended to cover the portion from the actual edges 17 of the glass ribbon up to the central third of the glass ribbon 2.

In a vertical drawing process it frequently happens that the marginal portions of the glass ribbon or parts thereof may have cooled to a temperature at the top of the annealing range by the time the ribbon 2 passes between the drawing rolls 7 which are the first pair of drawing rolls in the annealing lehr 1. The central portion of the glass ribbon 2, however, will not have cooled to a temperature at the top of the annealing range until the glass ribbon has passed between for example, the third and fourth drawing rolls which are not shown in either of the figures in the accompanying drawings.

With the particular ribbon of glass under consideration, by the time that the glass ribbon 2 passes between the fifth set of drawing rolls 11, the whole of the glass ribbon 2 will have cooled to a temperature in the annealing range. However, the position of the annealing zone in the lehr will depend in individual cases on the thickness of the ribbon being drawn as well as on other conditions in the drawing kiln and in the lehr.

Between the fifth ad sixth sets of drawing rolls 11 and 12 there are provided blowing tubes 18 which are arranged so that a gaseous fluid may be emitted therefrom directly on to the actual edges 17 of the glass ribbon 2. The gaseous fluid emitted is thus brought into heat exchange contact with the glass ribbon 2 in a direction parallel to the face of the glass ribbon and substantially perpendicular to the direction of the movement of the ribbon through the annealing zone and the lehr 1.

The exact position of the blowing tubes 18 will vary according to the thickness of the glass being drawn, the position shown in the drawings being that preferred for glass of 2.85 mm. thickness. For glass of some thicknesses, it is preferred to provide two pairs of blowing tubes 18 situated in appropriate positions, for example for glass of thickness of the order of 4 mm.–5.6 mm. one pair of blowing tubes is situated below the fifth set of drawing rolls while a second pair of blowing tubes is situated above the fifth set of drawing rolls.

The gaseous fluid which is introduced through the blowing tubes 18 is formed by burning ordinary town gas inside a burner chamber 19 (FIGURE 3), and the combustion products obtained are then introduced into the annealing tower through blowing tubes 18. The temperature of the gaseous fluid which passes through the blowing tubes 18 and strikes the edges of the glass ribbon 2 is of the order of 900° C. to 1100° C.

Between the seventh and eighth rolls 13 and 14 there are provided three sets of baffles 20, 21 and 22. These baffles 20 to 22 are similar to the baffles normally employed in the annealing lehr but are divided into three sections of approximately equal size, the baffles 21 corresponding with the central one third of the glass ribbon 2 and the other baffles 20 and 22 covering the marginal portions of the ribbon and extending approximately one third of the way in from the edges of the ribbon 2.

The baffles 20 and 22 are arranged so that their top edges extend to a distance about half an inch from the bottom of the drawing rolls 14 while the baffles 21 do not extend close to the drawing rolls 14. The gap between the top edges of the baffles 21 and the bottom of the drawing rolls 14 is about 1¼" or 1½".

By the arrangement of the baffles 20 to 22 such as described, the natural "chimney" effect which usually occurs in a vertical annealing lehr is regulated so that the upward flow of gas occurs almost entirely over the central portion of the glass ribbon 2. The baffles 20 and 22 extend so close to the drawing rolls 14 that the "chimney" over the marginal portions of the glass ribbon is effectively closed, while the baffles 21 are arranged so that the chimney is effectively open.

As the heated gas introduced by the blowing tubes 18 comes into heat exchange contact with the edges and marginal portions of the glass ribbon, it causes the temperature of the marginal portions to be raised. However, by the time that the gas from the blowing tubes 18 is passing over the central portion of the glass ribbon, it will have been cooled by the interchange of heat with the marginal portions of the ribbon and by mixture with the cooler gas normally present and rising through the annealing lehr 1.

In the embodiment of the invention being described, there are additionally provided, between the sixth and seventh drawing rolls 12 and 13, manifolds 23 having therein an opening 24 which extends across the full width of the glass ribbon 2. Again the exact position of the manifolds 23 in the lehr will depend on the exact location of the annealing zone in the lehr, which in turn depends on the thickness of the glass ribbon being drawn as well as on other conditions in the drawing kiln and in the lehr. The manifolds 23 are fed with a hot gaseoeus fluid obtained in a similar manner to that already described for the manifolds 18 and this gaseous fluid, at a temperature of approximately 1,000° C., is allowed to come into contact with the whole of the glass ribbon at any time at the level of the slot 24.

In FIG. 2 the opening 23 in the manifold 22 is shown as a slot which extends continuously across the full width of the glass ribbon 2. However, other forms of opening may be used, for example, there may be a series of perforations in the manifold 22 through which the gas is ejected. It is found, however, that if a continuous slot 23 is used, the quantity of gas which is brought into contact with the central portion of the glass ribbon 2 may be comparatively small, and so it is advantageous to use a discontinuous slot 23. In either case, however, the slot 23 may also include means for varying the width of the slot so that the quantity and pressure of the gas ejected may be varied.

The gas introduced from the manifold 23 together with the gas which is introduced through the blowing tubes 18 is constrained to pass over the central portion of the glass ribbon 2.

The introduction of the hot gaseous fluid through the manifolds 23 imparts additional heat to the ribbon uniformly across its whole width so that the glass in the ribbon remains for a longer period of time within the upper limits of the annealing range and so helps to minimise the temperature gradient between the centre and the surfaces of the ribbon.

Conveniently the blowing tubes 18 are arranged to be adjustable with respect to the burner chamber 19. In this way the quantity of the hot gas which passes down the respective faces of the glass ribbon 2 may be regulated. In particular it is found that if there is "bowing" of the glass sheet obtained by cutting the glass ribbon emerging from the top of the tower lehr, this may be removed by appropriate adjustment of the blowing tubes 18 with respect of the burner chamber 19, and consequently with a variation in the quantity of hot gas coming into contact with the respective faces of the glass ribbon 2.

In FIG. 4 of the accompanying drawings there is shown a modified arrangement in which the blowing tubes 18 are replaced by pairs of blowing tubes 25. These pairs of blowing tubes 25 are arranged so that they will blow hot gas down the respective faces of the glass ribbon 2 in a direction parallel to the face of the glass ribbon and substantially perpendicular to the direction of movement of the ribbon 2 through the annealing lehr 1, but without blowing on the actual edges of the glass ribbon.

In order to correct "bowing" in the arrangement of FIG. 4 it is necessary to adjust the flow of hot gas by controlling the admission of burnt gas to the respective orifices of each pair of blowing tubes.

It will be appreciated that the annealing lehr 1 is carefully sealed, at least up to the level of the baffles 20 to 22, in order to prevent the occurrence of casual in-draughts. The lehr 1 is thus sealed against in-draughts up to a position at which the glass ribbon 2 has passed through the annealing zone.

It is found that, when using an arrangement of the blowing tubes 18 or 25 and the baffles 20, 21 and 22, glass sheet obtained from the ribbon may be cut subsequently with a very considerably reduced loss of the glass due to unintended fractures caused by strains in the glass. With the manifold 23 also included in the annealing lehr, a further improvement in the "cuttability" of the glass is obtained.

Both these arrangements achieve the improvement in the quality of the glass sheet obtained at least partly as a result of reduction in the transverse temperature gradient in the glass ribbon. This reduction, or flattening out, of the temperature curve across the width of the glass ribbon, occurs because the heated gas coming into contact with the marginal portions of the glass ribbon raises the temperature of the marginal portions relative to the central portion of the ribbon.

We claim:

1. A process for improving the annealing of flat glass in ribbon form during which the glass is advanced through a lehr wherein the glass is annealed, characterized by raising the temperature of the marginal portions of the glass ribbon, including both surfaces of the said marginal portions, from a temperature substantially below the temperature of the corresponding central portion of the ribbon to a temperature near to the temperature of the corresponding central portion of the ribbon and to a temperature above the strain point of the glass, while the temperature of the corresponding central portion of the ribbon is above the strain point of the glass, until the glass in the central portion cools to near the strain point, and then allowing the glass in both the marginal and central portions while the temperatures of the marginal and central portions are near to each other to cool substantially at the same time below the strain point.

2. A process for improving the annealing of flat glass in ribbon form during which the glass is advanced through a lehr wherein the glass is annealed, comprising the steps of introducing a gaseous fluid into heat exchange contact with both surfaces of each of the marginal portions of the glass ribbon at one position in the annealing zone where the temperature of the marginal portions of the glass ribbon is substantially below the temperature of the corresponding central portion of the ribbon, and the temperature of the corresponding central portion of the ribbon is above the strain point of the glass, the temperature of said gaseous fluid being greater than the temperature of the glass in the annealing zone, and sufficient to raise the temperature of the said marginal portions near to the temperature of the corresponding central portion of the ribbon and above the strain point of the glass, said gaseous fluid being introduced into heat exchange contact with said marginal portions until the glass in the central portion cools to near the strain point, and then allowing the glass in both the marginal and central portions to cool substantially at the same time below the strain point.

3. A process according to claim 2, characterized by introducing the gaseous fluid into contact with the glass ribbon in a direction parallel to the face of the glass and substantially perpendicular to the direction of movement of the glass ribbon through the annealing zone in the lehr by causing the gaseous fluid to strike the actual edges of the glass ribbon and then to pass over both surfaces of the marginal portions of the glass ribbon at the said one position in the annealing zone so that the temperature gradients through and across the glass ribbon are controlled, and the strains in the resulting glass ribbon are reduced.

4. A process according to claim 2 wherein the gaseous fluid is brought into heat exchange contact with the glass ribbon at a temperature in the range of 900° C. to 1100° C.

5. A process for improving the annealing of flat glass in ribbon form during which the glass ribbon is raised vertically up an annealing tower wherein the glass is annealed, comprising the steps of introducing into heat exchange contact with both surfaces of each of the marginal portions of the glass ribbon at one position in the annealing zone a gaseous fluid, at a temperature greater than the temperature of the glass in the annealing zone and at such a velocity and under such conditions that the gaseous fluid contacts both the surfaces of the marginal portions of the glass ribbon at the said one position, imparts heat to both the said surfaces sufficiently to raise the temperature of the said marginal portions nearer to the temperature of the corresponding central portion of the ribbon and to a temperature above the strain point of the glass until the glass in the central portion cools to near the strain point, and flows upwardly without contacting the central portion of the ribbon corresponding to the marginal portions of the ribbon at the said one position where the gaseous fluid is introduced, constraining the upward flow of the now cooler gaseous fluid to pass over both surfaces of a central portion of the glass ribbon, and not over the surfaces of the marginal portions of the glass ribbon, at a higher position in the annealing zone, to retard the cooling of the central portion of the glass ribbon in the annealing zone with consequential decrease in the generation of residual strains in the glass in the annealing zone, and allowing the glass in both the marginal and the corresponding central portions to cool together below the strain point.

6. A process according to claim 2 characterized by additionally bringing into heat exchange contact with both surfaces of the glass ribbon in the annealing zone across the full width of the glass ribbon a gaseous fluid, the temperature of which is greater than the surface temperature of any part of the glass ribbon at the level in the annealing tower at which the additional gaseous fluid is introduced.

7. A process according to claim 6 wherein the gaseous fluid which is brought into heat exchange contact with both surfaces of the glass ribbon across the full width of the glass ribbon is at a temperature in the range of 900° C. to 1100° C.

8. A process for improving the annealing of flat glass in ribbon form during which the glass ribbon is raised vertically up an annealing tower wherein the glass is annealed, comprising the steps of introducing into heat exchange contact with both surfaces of each of the marginal portions of the glass ribbon at one position in the annealing zone a gaseous fluid at a temperature greater than the temperature of the glass in the annealing zone and at such a velocity and under such conditions that the gaseous fluid contacts both the surfaces of the marginal portions of the glass ribbon at the said one position, imparts heat to both the said surfaces sufficiently to raise the temperature of the said marginal portions nearer to the temperature of the corresponding central portion of the ribbon and to a temperature above the strain point of the glass until the glass in the central portion cools to near the strain point, and flows upwardly without contacting the central portion of the ribbon corresponding to the marginal portions of the ribbon at the said one position where the gaseous fluid is introduced, allowing the glass in both the marginal and the corresponding central portions to cool together below the strain point, additionally bringing into heat exchange contact with both surfaces of the glass ribbon in the annealing zone across the full width of the glass ribbon a gaseous fluid, the temperature of which is greater than the surface temperature of any part of the glass ribbon at the level in the annealing tower at which the additional gaseous fluid is introduced, and constraining the upward flow of the gaseous fluids which has been introduced into the tower to contact both surfaces of the marginal portion of the glass ribbon and both surfaces of the ribbon across its full width, after such ribbon contacts, to cause them to pass over both surfaces of a central portion of the glass ribbon and not over the surfaces of the marginal portions of the glass ribbon at a higher position in the annealing zone to retard cooling of the central portion of the glass ribbon in the annealing zone with consequential decrease in the generation of residual strains in the glass in the annealing zone.

9. An apparatus including a vertical lehr for annealing sheet glass in ribbon form, the lehr comprising rolls for guiding the ribbon through the lehr, means for blowing a gaseous heating fluid in the vicinity of the marginal portions of the ribbon and in a direction to cause said fluid to come in contact with both surfaces of said marginal portions in preference to the central portion of the ribbon, and baffle means positioned at a level in the lehr above the level of said blowing means for preventing the passage of the gaseous fluid vertically upwards in the lehr in contact with said marginal portions and for confining the vertical passage upwards of said gaseous fluid for exclusive contact of said gaseous fluids with both surfaces of the central portion of the glass ribbon.

10. An apparatus according to claim 9, comprising manifold means positioned in the lehr at a level between the blowing means and the baffle means and so arranged that a gaseous fluid emitted by said manifold means is caused to strike both faces of the glass ribbon over substantially their whole width.

References Cited by the Examiner
UNITED STATES PATENTS

| 1,576,516 | 3/1926 | Koupal | 65—118 |
| 1,726,114 | 8/1929 | Morton | 65—95 |
| 1,988,560 | 1/1935 | Kutchka | 65—194 |
| 2,774,190 | 12/1956 | Atkeson | 65—95 |

DONALL H. SYLVESTER, *Primary Examiner.*

A. D. KELLOGG, *Assistant Examiner.*